UNITED STATES PATENT OFFICE.

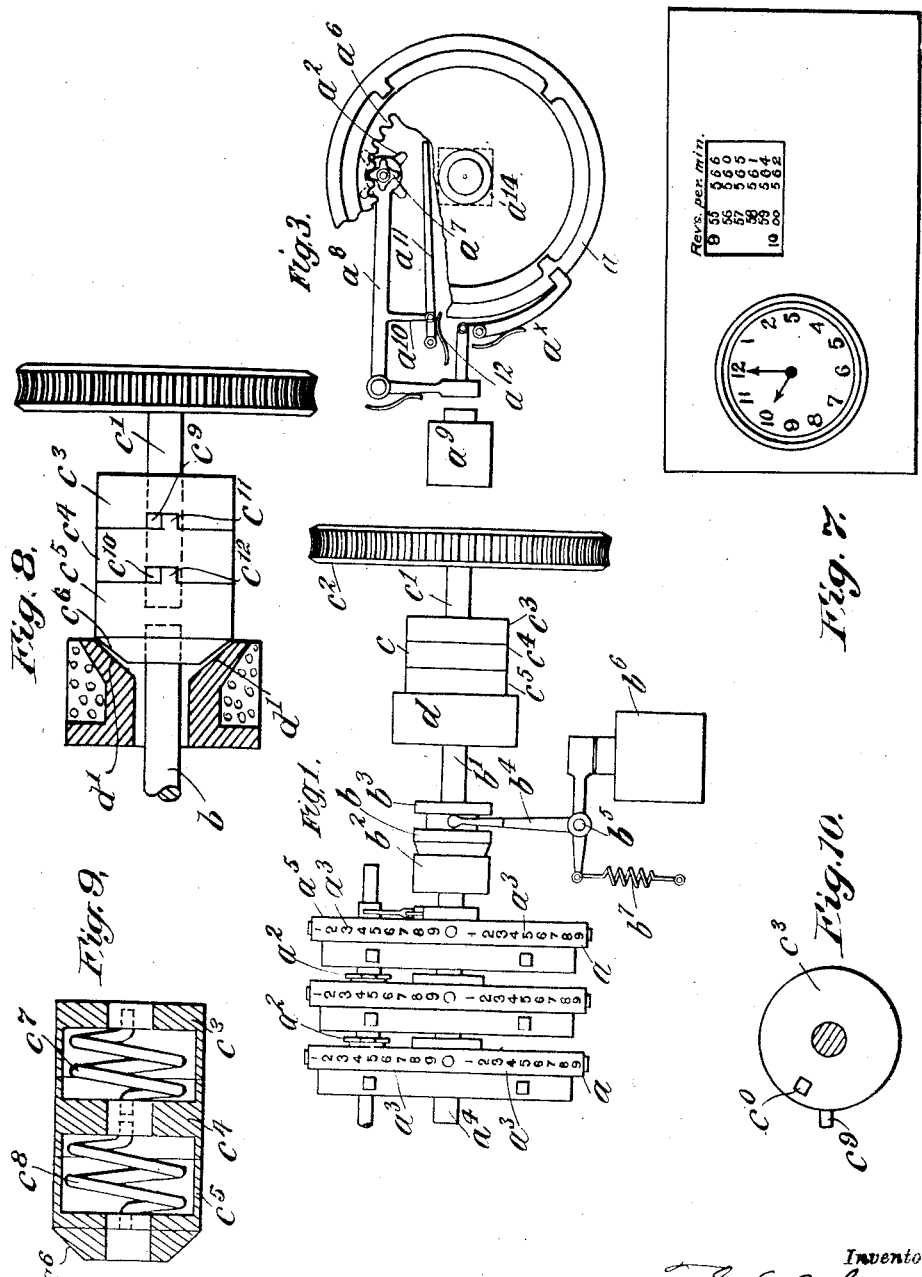

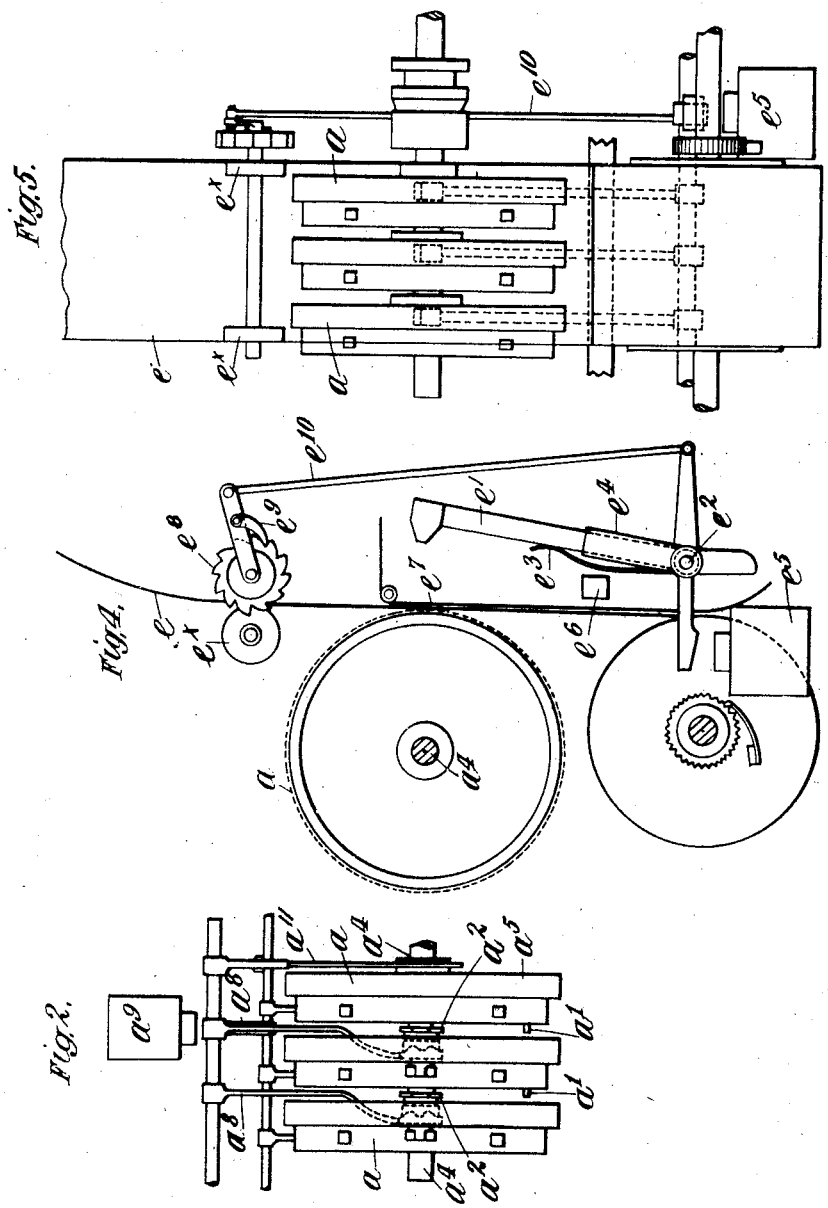

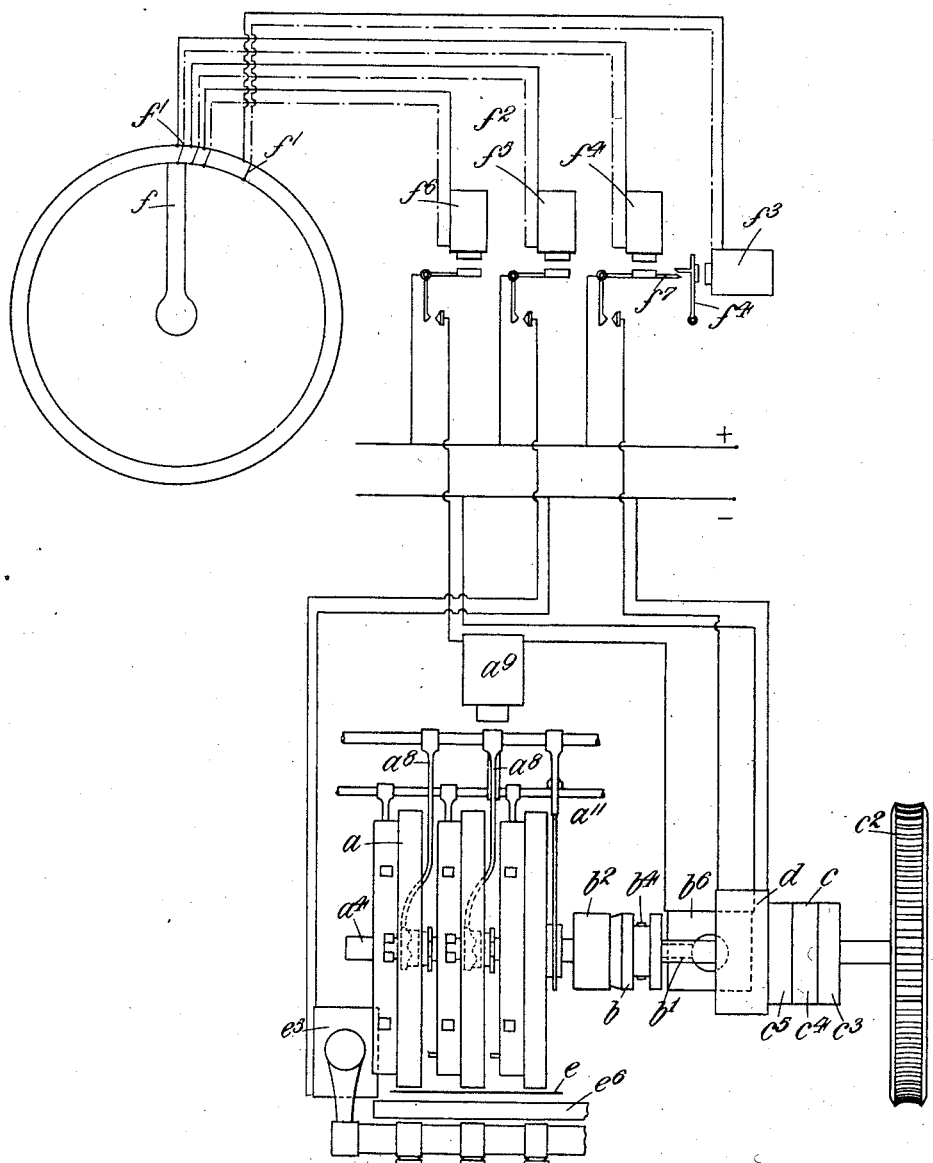

FREDERICK GEOFFREY LEES JOHNSON, OF CHELSEA, LONDON, ENGLAND.

SPEED INDICATING AND RECORDING APPARATUS OF THE PERIODIC-COUNTER TYPE.

1,166,596. Specification of Letters Patent. Patented Jan. 4, 1916.

Application filed April 26, 1915. Serial No. 24,147.

*To all whom it may concern:*

Be it known that I, FREDERICK GEOFFREY LEES JOHNSON, a subject of the King of Great Britain, residing at 12 St. Leonards Terrace, Chelsea, in the county of London, England, have invented certain new and useful Improvements in or Relating to Speed Indicating and Recording Apparatus of the Periodic-Counter Type, of which the following is a specification.

This invention relates to improvements in speed indicating and recording apparatus of the periodic counter type which are adapted to indicate or record the revolutions or movements made by a shaft or other moving member during consecutive intervals of time, so that the speed or rate of movement of the shaft or moving member may be readily ascertained at each consecutive interval.

According to this invention the apparatus comprises a number of counting or type wheels which are adapted to be held stationary relatively to a continuously moving driving shaft and to be subsequently released and caused to regain their lost motion. The indications or records may be effected at intervals of a minute or any other period of time.

I may employ a rotary or other form of counter which is driven through a spring controlled device and suitable gearing receiving motion from the revolving shaft or the like whose revolutions are to be indicated or recorded during the consecutive and predetermined intervals of time, appropriate electrical or mechanical means being provided for stopping the movement of the counter at the predetermined intervals and obtaining an impression of the indications of the counter upon a strip or sheet of paper or other material traveling intermittently in the vicinity of the said counter, after which the counter is re-set or returned to its zero position; the aforesaid spring controlled device being energized or rendered active during the periods of rest and resetting of the counter and afterward operating to cause the counter to regain the motion it lost during its stoppage and to be then driven from the aforesaid shaft or the like until the next predetermined interval of time expires, whereupon the above stated sequence of operations is repeated and so on during the working of the apparatus.

In order that the said invention may be clearly understood and readily carried into effect I will proceed to describe the same more fully with reference to the accompanying drawings, in which:—

Figure 1 is an elevation of the counting or type wheels and actuating mechanism for one embodiment of the invention. Fig. 2 is a plan of the counting wheels and resetting mechanism and Fig. 3 is a side view thereof. Figs. 4 and 5 are respectively a side and front elevation of the counting wheels and recording mechanism. Fig. 6 is a diagrammatic view of the electrical connections of the apparatus. Fig. 7 is an external view of the apparatus in the form it is actually made. Fig. 8 is a side elevation of the spring-controlled device and the electromagnet pertaining thereto, the latter being shown in section; Fig. 9 is a sectional elevation of the spring-controlled device, and Fig. 10 is an end view thereof.

The apparatus comprises a number of counting wheels or drums $a$ which are provided with tappets $a'$ and co-acting star wheel pinions $a^2$ so that the counting wheels act cumulatively and indicate the total number of revolutions or the like made by the shaft or other moving member the predetermined intervals of time. The counting wheels $a$ are provided on their peripheries with four or more sets of type $a^3$, each comprising the numbers 0 to 9 equally spaced. With this arrangement the periphery of each wheel is divided into forty divisions which are disposed in groups of ten, these groups being so placed that the points common to adjacent quadrants bear the character 0 or zero.

The counting or type wheels $a$ are mounted on a single shaft $a^4$ and with the exception of the units wheel $a^5$ are loosely mounted thereon. The units wheel is keyed or otherwise secured to the shaft $a^4$ and is adapted to rotate therewith. One end of the shaft $a^4$ is provided with an electrically operated friction clutch $b$ which is adapted to connect the shaft $a^4$ with the adjacent end of an intermediate shaft $b'$. The clutch $b$ comprises a female portion $b^2$ mounted on the shaft $a^4$ and a male portion $b^3$ splined on the intermediate shaft $b'$. The male portion $b^3$ is displaced along the shaft $b'$ by means of a forked arm $b^4$ carried by the shaft $b^5$, the latter shaft being angularly displaced for this purpose by means of the electro-magnet $b^6$ and the spring $b^7$.

The end of the intermediate shaft $b'$ remote from the friction clutch $b$ is provided with an electrically controlled spring coupling $c$ adapted to connect the same with another shaft $c'$ which is driven through gearing $c^2$ by the shaft or other moving member whose revolutions or movements are to be indicated and recorded. The spring coupling comprises three sections or convolutions $c^3$, $c^4$, $c^5$ of which the section $c^3$ is splined to the shaft $c'$ and the section $c^5$ rigidly attached to the intermediate shaft $b'$. A stationary electromagnet $d$ is arranged adjacent to the section $c^5$ of the spring coupling and when said electromagnet is energized it serves to attract said section so that a conical clutch portion $c^6$ thereon engages with a corresponding portion $d'$ of the electromagnet and rigidly holds said section and the intermediate shaft $b'$ in a stationary condition. When the section $c^5$ is held in this manner the other sections can continue to revolve with the shaft $c'$ for two complete revolutions. The sections of the spring coupling are normally held as a single unit by internal springs $c^7$, $c^8$ (Fig. 9) and when the electro-magnet $d$ is deënergized and the section $c^5$ is released the internal springs will reset the sections so that they resume their normal relative position. The ends of the said springs are inserted into slots or openings $c^0$ (Fig. 10) formed in the end walls of the respective sections. The sections $c^3$ and $c^4$ of the spring coupling are provided with radial projections or stops $c^9$ and $c^{10}$, which are adapted to engage respectively with projections $c^{11}$ and $c^{12}$ formed on the edges of the sections $c^4$ and $c^5$. Owing to this arrangement, the adjacent sections will be free to effect a revolution relative to each other before the stops abut and a rigid drive is obtained. This will allow the intermediate shaft to be held stationary while the shaft $c'$ is making two revolutions. The spring coupling is consequently of such character that the section $c^5$ which has been stationary during the period the electro-magnet $d$ was energized will, by the action of the internal springs, overtake the sections $c^3$, $c^4$, and resume the position it normally occupied with respect thereto. It will be seen therefore that when the shafts $b'$ and $c'$ are disengaged the sections of the spring couplings are relatively displaced, this relative movement energizes the spring so that when the sections $c^5$ thereof is liberated it will cause the shaft $b'$ to overtake the shaft $c'$ and resume its normal position relative thereto. The object of providing a coupling of this type is to enable the desired indications of the counting wheels $a$ to be recorded on a band of paper or the like $e$. Fig. 4. To do this it is necessary that the type wheels should be at rest when the impression or record is made on the band $e$ and to compensate for the stoppage of the type wheels some device must be employed to accelerate their movement and allow of them to regain the motion they have lost with respect to the continuously moving shaft whose revolutions are to be indicated and recorded.

All of the type wheels $a$ excepting the units wheel $a^5$, are provided with internal teeth $a^6$, Fig. 3, adapted to be driven by a pinion $a^7$ intermittently operated by the adjacent type wheel of lower order through the tappet $a'$ and star wheel $a^2$. The pinion $a^7$ is mounted on a pivot lever $a^8$ which is adapted to be actuated by an electro-magnet $a^9$ to disengage the pinion from the internal teeth $a^6$ during the resetting of the type wheels $a$. The levers $a^8$ $a^8$ carrying the pinions $a^7$ $a^7$ are each provided with an arm $a^{10}$ which is operatively connected with a spring controlled detent or pawl $a^{11}$. When the levers $a^8$ $a^8$ are depressed by the electromagnet $a^9$ they will force the detents $a^{11}$ $a^{11}$ down against the action of the springs $a^{12}$ $a^{12}$ until they rest flat on one of the surfaces of the square bosses $a^{14}$ $a^{14}$ of the type wheels. The displacement of the levers $a^8$ thus first releases the type wheels and finally, through the intervention of the detents $a^{11}$, resets the same to zero. The movement of the type wheels is checked and their zeroizing accurately effected by means of the spring detent $a^x$ which is brought into action by the initial movement of the armature of the electro-magnet $a^9$ and withdrawn by the final movement thereof. As each type wheel carries four sets of figures or type $a^3$ the resetting to zero can be effected by displacing the same in either direction through an angle of 45 degrees. The arrangement moreover enables the speed of rotation of the type wheels to be reduced to 1/40th of the speed of the shaft or other member to which the apparatus is applied.

The record as previously mentioned is made on the band of paper or the like $e$ Figs. 4 and 5, which is adapted to be intermittently fed past the type wheels $a$. The impression is made on the band by means of a spring controlled hammer $e'$ which is adapted to press the paper against the type at the predetermined intervals of time. The hammer is mounted on a shaft $e^2$ so as to be free to turn thereon against the action of the spring $e^3$. A frame or member $e^4$ is rigidly mounted on the shaft $e^2$ and the spring $e^3$ is adapted to retain the hammer in line with the said member $e^4$. The shaft $e^2$ is adapted to be angularly displaced by the electro-magnet $e^5$ and when this occurs the member $e^4$ suddenly strikes a stop $e^6$ so that the momentum of the hammer overcomes the action of the spring $e^3$ and causes the hammer to fly forward and strike the paper thus momentarily pressing it against the type wheels. Immediately the hammer strikes the paper the spring $e^3$ will assert its action and return the hammer to its original position alongside the member $e^4$. A band of carbon paper $e^7$ is arranged between the hammer and the band of paper $e$ so that the impression of the characters on the type wheels may be made on the paper in the usual manner The intermittent movement of the band $e$ past the type wheels is effected by means of a ratchet wheel $e^8$ and pawl $e^9$ Figs. 4 and 5, the said pawl being connected with the hammer shaft $e^2$ by a link $e^{10}$ so that each oscillation of the said shaft causes the paper to be moved the desired distance for receiving the next impression. The movement is imparted to the band $e$ by means of fiber rollers $e^x$ mounted on opposite sides of the band and actuated by the ratchet wheel $e^8$.

In order to effect the proper sequence of operations of the various electrically actuated members of the apparatus they are controlled by a rotating contact arm $f$, Fig. 6, driven uniformly by a clock or similar mechanism, which arm in the present example makes one revolution a minute. The arm $f$ moves over a number of contacts $f'$ which are suitably disposed in its path and which are made and broken in order to effect the desired energization of the electromagnets pertaining to the various electrically actuated members of the apparatus in sequence. The time allowed for controlling the electrically actuated members of the apparatus in the present case is four seconds so that assuming the speed of the shaft $c'$ to be 600 revolutions a minute the free sections of the spring coupling $c$ make one complete revolution in this time. As the sections of the spring coupling are free to make two revolutions there is a margin of time which allows of the speed to be safely increased to 1000 revolutions a minute. Should the apparatus be required for higher speeds, more sections of springs could be provided on the coupling $c$ and a greater number of complete sets of figures could be used.

For high speeds it would be necessary to modify the apparatus by providing means for absorbing the momentum of the type wheels when they are reset to zero.

The electromagnets are energized through the intervention of suitable relays $f^2$ and the stopping and starting of the type wheels are effected while the shaft $c'$ of the apparatus makes one revolution. The duration of the period of recording may however be varied to suit requirements by varying the disposition of the contacts $f'$.

The release of the spring coupling $c$ after the recording has taken place is effected by means of a supplementary electro-magnet $f^3$ Fig. 6, which is adapted to release a trip or catch $f^4$ which serves to maintain the circuit of the electro-magnet $d$ of the spring coupling when it is suitably closed by the relay pertaining thereto. In this way the magnet $f^3$ controls the duration of the period during which the various operations are effected. The sequence of operations which occur at the end of a minute or other predetermined interval of time is as follows. The circuit of the magnet $d$ of the spring coupling is closed by the contact arm $f$ through the relay $f^4$ and the magnet is energized to lock the section $c^5$ of the spring coupling on the intermediate shaft $b'$ and prevent the same and therefore the type wheels $a$ from rotating with the driving shaft $c'$. Then the circuit of the magnet $e^5$ of the impression or recording hammer $e'$ is closed and broken by the contact arm $f$, and relay $f^5$ and the indication of the type wheels recorded on the traveling band $e$, the latter being then fed forward one step by the pawl $e^9$ so as to assume the position for receiving the next impression. The circuits of the magnet $b^6$ pertaining to the clutch $b$ between the intermediate shaft $b'$ and the shaft $a^4$ of the type wheels and the magnets $a^9$ of the resetting mechanism of said wheels are then closed and broken by the contact arm $f$ and the relay $f^6$ so as to effect the resetting of the wheels and the recoupling of the same to the intermediate shaft $b'$. The supplementary electromagnet $f^3$ of the spring coupling is finally energized by the contact arm $f$ closing the circuit thereof so that the catch $f^4$ is withdrawn to release the contact making lever $f^7$ of the electromagnet $d$ and interrupt the circuit thereof. The locked section $c^5$ of the spring coupling is thus released so that it and the type wheels $a$ can overtake the other sections of th spring coupling and the driving shaft $c'$ and thus make up for the lost motion that occurred during the recording and resetting operations. The apparatus will then be in condition for making a further record at the end of the next predetermined interval of time.

Instead of electrically controlling the operation of the various parts of the apparatus the same result may be effected by mechanical means such as cam or tappet mechanism which is under the control of a clock movement or some other member which is running or moving at a constant speed.

The type wheels may be replaced by type bars or the like which are adapted to have a rectilinear movement imparted to them as distinguished from the rotary or angular movement imparted to the type wheels. All the bars will be interconnected to totalize the revolutions or other movements to be recorded during the predetermined interval of time and the units type bar may have movement imparted to it by a star wheel or ratchet mechanism pertaining to the driving shaft. The resetting in this case may be effected by gravity, for when the bars are released electrically or otherwise after a record has been made at the expiration of the predetermined interval of time they will fall to the original or zero position. In order to steady the movements of the bars they may be provided with buffers, dash pots or similar devices and in some cases may be reset by springs or the like.

I may provide the apparatus with means for enabling the various indications or records of the speed of the shaft or other member at the successive predetermined intervals of time to be totalized after the expiration of any desired interval of time. This however would entail an additional electromagnet for operating a separate hammer for printing the total.

A simple clock counter may be employed with the apparatus, said counter being adapted to be operated electrically by the contact arm $f$ to obtain a record of both the time and the number of revolutions as would be the case with the apparatus shown in Fig. 7.

What I claim and desire to secure by Letters Patent of the United States is:—

1. In a speed indicating and recording apparatus of the periodic-counter type, the combination with a driving shaft, of a plurality of type wheels, a sectional spring coupling for connecting said wheels to the driving shaft, and means for temporarily holding a section of said spring coupling stationary to enable the recording of the indications of the type wheels to be effected, the spring coupling adapted when said section is released by said means to cause the wheels to over-run the driving shaft and assume that position with respect to the driving shaft that they would have naturally assumed if the wheels were not held stationary by said means.

2. In a speed indicating and recording apparatus of the periodic counter type the combination with a driving shaft of a number of counting or type wheels, a sectional spring coupling for connecting said wheels to the driving shaft and an electromagnet for temporarily holding a section of said spring coupling stationary to enable the recording of the indications of the counting or type wheels to be effected, the spring coupling adapted when the electromagnet is deënergized to cause the wheels to over-run the driving shaft and assume that position with respect to the driving shaft which they would have naturally assumed if the wheels were not held stationary by said electro-magnet.

3. In a speed indicating and recording apparatus of the periodic counter type the combination with a driving shaft of two co-axial shafts, a number of counting or type wheels carried by the co-axial shafts remote from the driving shaft, a sectional spring coupling for connecting the intermediate co-axial shaft to the driving shaft, an electromagnet for temporarily holding a section of said spring coupling stationary, a clutch for connecting the intermediate shaft to the shaft carrying the counting or type wheels and means for operating said spring coupling and clutch in sequence to enable the recording of the speed and the zeroizing of the counting wheels to be effected.

4. In a speed indicating and recording apparatus of the periodic counter type the combination with a driving shaft of two co-axial shafts, a number of counting or type wheels carried by the co-axial shaft remote from the driving shaft, a sectional spring coupling between the intermediate shaft and the driving shaft, an electromagnet for temporarily holding a section of said spring coupling stationary, an electrically operated clutch between the intermediate shaft and the shaft carrying the counting or type wheels, a band of paper or the like arranged in proximity to said wheels, an electrically controlled hammer which presses the paper against said wheels to effect the record, mechanism for imparting longitudinal movement to the said band of paper after the record has been made, electrically operated mechanism for releasing and zeroizing said wheels and an electric contact making device for controlling and operating the various electrically operated members in proper sequence.

5. In a speed indicating and recording apparatus of the periodic counter type the combination with a driving shaft of two co-axial shafts, a number of counting or type wheels carried by the co-axial shaft remote from the driving shaft, equally spaced sets of type characters on said wheels, a sectional spring coupling between the intermediate shaft and the driving shaft, an electromagnet for temporarily holding a section of said spring coupling stationary, an electrically operated clutch between the intermediate shaft and the shaft carrying the counting or type wheels, a band of paper or the like arranged in proximity to said wheels, an electrically controlled hammer which presses the paper against said wheels to effect the record, mechanism for imparting longitudinal movement to the said band of paper after the record has been made, electrically operated mechanism for releasing and zeroizing said wheels and an electric contact making device for controlling and operating the various electrically operated member in proper sequence.

6. In a speed indicating and recording apparatus of the periodic counter type the combination with a driving shaft of two co-axial shafts, a number of counting or type wheels carried by the co-axial shaft remote from the driving shaft, equally spaced sets of type characters on said wheels, a spring coupling between the intermediate shaft and the driving shaft, an electromagnet for temporarily holding a section of said spring coupling stationary, an electrically operated clutch between the intermediate shaft and the shaft carrying the counting or type wheels, a band of paper or the like arranged in proximity to said wheels, an electrically controlled hammer which presses the paper against said wheels to effect the record, mechanism for imparting longitudinal movement to the paper band after the record has been made, electrically operated mechanism for releasing and zeroizing said wheels, an electric contact making arm moving at a constant speed for controlling and operating the various electrically operated members in proper sequence and a trip or catch which serves to maintain the supply of current to the electromagnet pertaining to the spring coupling when its circuit is initially closed to control the duration of the period during which the various operations are effected.

FREDERICK GEOFFREY LEES JOHNSON.